(12) United States Patent
Wei et al.

(10) Patent No.: US 7,416,300 B2
(45) Date of Patent: Aug. 26, 2008

(54) MEASUREMENT OF LENSES AND LENS MOLDS USING OPTICAL COHERENCE TOMOGRAPHY

(75) Inventors: Jianping Wei, San Ramon, CA (US); Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 11/752,202

(22) Filed: May 22, 2007

(65) Prior Publication Data

US 2008/0007694 A1 Jan. 10, 2008

Related U.S. Application Data

(60) Provisional application No. 60/803,205, filed on May 25, 2006.

(51) Int. Cl.
*G02C 7/02* (2006.01)
(52) U.S. Cl. .......................... 351/177; 351/41; 351/159
(58) Field of Classification Search ................ 351/41, 351/159, 160 R, 177; 356/124, 125, 126, 356/127
See application file for complete search history.

(56) References Cited

U.S. PATENT DOCUMENTS

| 5,491,524 A | 2/1996 | Hellmuth et al. |
| 2004/0021874 A1 | 2/2004 | Shimmick |
| 2006/0206102 A1* | 9/2006 | Shimmick ...................... 606/4 |
| 2007/0195311 A1 | 8/2007 | Morgan et al. |

FOREIGN PATENT DOCUMENTS

| EP | 0 661 134 A1 | 7/1995 |
| EP | 1 316 836 A1 | 6/2003 |
| GB | 2 355 310 A | 4/2001 |

OTHER PUBLICATIONS

S. Radhakrishnan, et al., "Real-Time Optical Coherence Tomography of the Anterior Segment at 1310 nm, Arch Ophthalmol," Aug. 2001, vol. 119, pp. 1179-1185, (7pgs.).
R. Windecker, et al., "Fast Coherence Scanning Interferometry for Measuring Smooth, Rough and Spherical Surfaces," Journal of Modern Optics, vol. 42, No. 10, 1995, pp. 2059-2069, (12 pgs.).
B.J. Kaluzny, et al., "Spectral Optical Coherence Tomography: A New Imaging Technique in Contact Lens Practice," Ophthal. Physiol. Opt., vol. 26, Mar. 2006, pp. 127-132 (6 pgs.).

* cited by examiner

*Primary Examiner*—Huy K Mai
(74) *Attorney, Agent, or Firm*—Klein, O'Neill & Singh LLP

(57) ABSTRACT

Optical coherence tomography (OCT) systems are used to measure lenses. The present methods use an OCT system to obtain one or more images of a lens. For example, an OCT system can be used to obtain section images, surface images, or combinations of section images and surface images of vision correcting lenses, such as contact lenses, intraocular lenses, corneal onlay lenses, corneal inlay lenses, and spectacle lenses, or non-vision correcting lenses, such as optical instrument and diagnostic instrument lenses. The images can be used to determine features of the lens, such as surface shapes, thicknesses, curvatures, lens powers, and edge profiles, among others. The present methods include lens metrology methods, lens design methods, and lens manufacturing methods.

44 Claims, 2 Drawing Sheets

MEASUREMENT OF LENSES AND LENS MOLDS USING OPTICAL COHERENCE TOMOGRAPHY

CROSS-REFERENCE TO RELATED APPLICATIONS

This application claims the benefit of U.S. Application No. 60/803,205, filed May 25, 2006, the entire contents of which are hereby expressly incorporated herein by reference.

FIELD OF THE INVENTION

The present invention relates to measuring features of lenses and/or lens molds. More particularly, the invention relates to metrology methods, design methods, and manufacturing methods for lenses, including vision correcting lenses, such as contact lenses, using optical coherence tomography.

BACKGROUND

Measuring physical features of lenses is important for determining appropriate design and manufacturing aspects of lenses. This importance is particularly significant in the design and manufacture of vision correcting lenses, such as contact lenses, intraocular lenses, corneal onlay lenses, corneal inlay lenses, and spectacle lenses, where the lenses are produced to correct or enhance a patient's vision.

Typically, when vision correcting lenses, such as contact lenses, are being measured, it is necessary to physically section or cut the lens. For example, to examine a thickness profile of a contact lens, it is necessary to cut the lens along one or more meridians and then obtain an image of the cross-section of the lens. Frequently, the sectioning of the lens is only performed along a single meridian and therefore, in order to obtain an accurate thickness profile map of the contact lens, it is necessary to cut many individual lenses from among a batch of lenses.

To determine or examine the curvature of a lens, such as a contact lens, the curvature is estimated by placing the lens on a planar surface so that the physical distance from the lens edge to the highest point of the lens can be measured to determine the sagittal height of the lens. The sagittal height can then be used to estimate the curvature of the lens. Although such a method may be useful in determining the curvature of a spherical lens, the method becomes less accurate as non-spherical lenses are being examined. Another method of estimating lens curvature includes the use of a keratometer. For example, a keratometer can be used to estimate lens curvature by measuring two reflected images reflected from the back surface of the lens.

Thus, there remains a need for new methods which enable a lens to be measured, such as without physically cutting a lens, and that provide accurate surface measurements of both spherical and non-spherical lenses.

SUMMARY

The present methods attempt to address this and, other needs. The present methods use one or more optical coherence tomography (OCT) systems to provide one or more images of a lens or a mold from which a lens can be obtained. As described herein, OCT systems can be used to image lenses in lens metrology methods, lens design methods, and lens manufacturing methods. Not only can the OCT system be used in lens metrology methods to measure one or more features of the lens being imaged, but the OCT system can be used as a quality control component of a lens manufacturing system. The OCT system can be used to provide images of a variety of lenses, including vision correcting lenses, such as contact lenses, intraocular lenses, corneal onlay lenses, corneal inlay lenses, and spectacle lenses. The images can be examined to determine one or more features of the lens, such as lens curvature, lens shape, lens thickness, lens edge design, and the like. Thus, the present methods permit one or more lenses to be measured, designed, or produced without physically cutting the lenses and by accurately determining the surface shape of the lens for both spherical and non-spherical lenses.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and additional disclosure.

DETAILED DESCRIPTION

Figure 1:
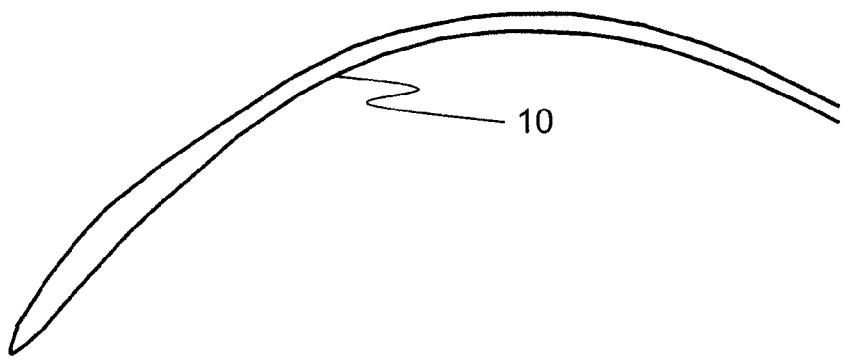
FIG. 1 is an illustration of a section view of a contact lens imaged in vitro using an OCT system.

New methods of measuring lenses and/or lens molds, designing lenses, and manufacturing lenses have been invented. The present methods permit the measurement of one or more lenses without cutting the lenses or contacting the lenses with an examining device or instrument. Using the present methods, lens features, such as lens thicknesses and lens surface shapes among other things, can be determined. The present methods use an optical coherence tomography (OCT) system to produce one or more images of a lens being measured, as described herein.

OCT is a known biological tissue optical scanning technique that produces high resolution cross sectional images of optical reflectivity. OCT is based on the principle of using a low-coherence interferometer (Michelson interferometer) where distance information concerning various biological structures is extracted from the time delays of the reflected signals. OCT systems are able to provide images of biological tissue with a micrometer resolution.

As is understood by persons of ordinary skill in the art, an OCT system can utilize a broadband superluminescent diode (SLD) as a light source to emit light. The emitted light can be directed to an interferometer, such as a conventional Michelson interferometer. Two beams of light can be obtained from the emitted light using a beam splitter. One beam is understood to be a sample beam. The sample beam is typically focused on the item being imaged. The second beam can be understood to be a reference beam. The reference beam is directed to a mirror.

The sample bean penetrates the material being imaged and can then be reflected or scattered backward as it interacts with materials or portions of materials that have different reflective indices. A detector device combines the back-reflected light from the sample path and the reflected light of the reference beam. When the optical path difference between the sample path reflection beam and the reference path reflection beam is within the coherence length of the light source, interference occurs.

The OCT system performs a series of scans with the light beam. The axial or longitudinal scan is typically referred to as an A scan. The A scan provides data in a single dimension. However, when more than one A scan is obtained at contiguous or adjacent transverse points, the individual scans can be combined to provide 2 dimensional data. The axial resolution of existing OCT systems is limited only by the coherence length of the light source. The transverse resolution of existing OCT systems is limited by the beam diameter.

OCT systems have been previously described and are publicly available. One example of an OCT system is the OCT Scanner (Humphrey Instruments, Inc., San Leandro, Calif.) as described in U.S. Pat. No. 5,491,524, entitled, "Optical coherence tomography corneal mapping apparatus". Another OCT system is known as the Heidelberg Retina Tomograph (HRT; Heidelberg Engineering GmbH, Heidelberg, Germany) as described in U.S. Pat. No. 5,170,276, entitled, "Apparatus for imaging an object". Yet another OCT system is known as the Visante OCT system available from Carl Zeiss Meditec (Dublin, Calif.).

The Visante OCT system has been developed and is described for imaging the anterior chamber of an eye. It uses a 1300 nm wavelength light source to provide a desired penetration through the sclera and iris of an eye with minimal scattering.

These publicly available OCT systems function in a time domain, and have axial resolutions of about 3 micrometers, and transverse resolutions from about 15-20 micrometers. Such systems can produce a single image consisting of about 600 A-scans in about 4 seconds.

Another OCT system has been described which has improved sensitivity relative to time domain OCT systems, and has shorter acquisition times relative to existing systems. These OCT systems are referred to as spectral optical coherence tomography (SOCT) systems. SOCT systems can produce three-dimensional images in real time. The high speed imaging associated with SOCT systems can help reduce motion artifacts that may be present. An SOCT system has recently been described to evaluate contact lens fit on patients (Kaluzny et al., "Spectral optical coherence tomography: a new imaging technique in contact lens practice", Ophthal. Physiol. Opt., 26:127-132, 2006).

As described herein, methods have been invented which use an OCT system to measure lenses. As used herein, a lens refers to a device other than the lens of the eye or the cornea of the eye. Thus, a lens can be a vision correcting lens, or a lens of an optical instrument or device, or a lens of a diagnostic instrument or device.

In one embodiment, a metrological method for a lens comprises imaging a lens using an OCT system to obtain at least one image of the lens. The lens is selected from the group consisting of vision correcting lenses, optical instrument lenses, diagnostic instrument lenses, and combinations thereof.

The OCT systems can be also be used in the design of lenses and/or in the manufacture of lenses. Thus, the present invention also relates to methods of designing lenses and methods of manufacturing lenses.

For example, another embodiment of the present invention includes a method of designing a lens that comprises examining information obtained from at least one image of a first lens imaged with an OCT system, and designing a second lens using the examined information of the first lens.

In another embodiment, a method of manufacturing a lens comprises examining information obtained from at least one image of a lens imaged with an OCT system during the manufacture of the lens, and controlling the quality of lenses produced using the examined information of the lens. The use of the OCT system can help with quality control of lenses produced during a manufacturing process. The use of the OCT system can be understood, at least in certain embodiments, to provide an "in line" quality control of the lenses, including contact lenses. For example, by including one or more OCT imaging stations in a lens manufacturing line, lenses, such as contact lenses, can be produced and inspected for appropriate features, such as thickness profiles, powers, curvatures, and the like, without substantial down time or delays in the manufacturing process. Embodiments of the present methods which include an OCT system as a quality control component or in a quality control station, can include a step of accepting or rejecting an imaged lens, or a batch of lenses based on images obtained by the OCT system. In addition, or alternatively, methods can include a step of classifying the imaged lens or a batch of lenses corresponding to the imaged lenses into one or more categories. For example, if a lens of a batch of lenses is imaged using an OCT system, as described herein, and is determined to have a different optical power than originally intended, that batch of lenses could be classified into a category of lenses having that same optical power, as opposed to the intended optical power, and still be used without being rejected. Thus, the use of OCT images can be helpful in increasing the yield rate of acceptable lenses being manufactured compared to yield rates of lenses obtained from manufacturing lines that do not include an OCT imaging component. For example, the yield rate for clinically acceptable contact lenses using the present methods can be greater than 95% for pre-extracted or pre-hydrated contact lenses, can be greater than 80% for hydrated non-silicone hydrogel contact lenses, and can be greater than 20% for silicone hydrogel contact lenses. In certain methods, yield rates of clinically acceptable hydrated silicone hydrogel contact lenses can be greater than 40%, greater than 50%, greater than 60%, greater than 70%, greater than 80%, or greater than 90%.

The present methods use one or more OCT systems to produce one or more images of one or more lenses or lens molds from which lenses are obtained. The lens images can then be examined to measure one or more features of the lenses, such as physical features, optical features, and the like. The OCT systems can be conventional OCT systems, such as the publicly available OCT systems described herein, or the OCT system can be a SOCT system, as described above.

In practicing the present methods, the OCT system or systems can be used to provide images of a variety of different lenses. For example, certain methods may use the OCT system to image a vision correcting lens or an ocular refractive correction device. Examples of lenses that can be imaged with the OCT systems include, without limitation, contact lenses, intraocular lenses, corneal onlay lenses, corneal inlay lenses, and spectacle lenses. In certain specific embodiments disclosed herein, the lens used in the present methods is a contact lens.

Contact lenses imaged in accordance with the present methods can be formed from a variety of materials and can have desirable design features. For example, the present contact lenses can be understood to be hydrogel lenses, or lenses that are water swellable or lenses that are swollen with water. Some hydrogel lenses may be free of silicon, for example, poly(2-hydroxyethyl methacrylate) (polyHEMA)-based lenses, as understood by persons of ordinary skill in the art. Other hydrogel lenses may include a silicon-containing component or a silicone-containing component, for example, the present contact lenses may be silicone hydrogel contact lenses. Examples of silicone hydrogel materials useful in the present contact lenses include materials having a US Adopted Name (USAN) of Lotrafilcon (such as Lotrafilcon A; Ciba Vision), Balafilcon (such as Balafilcon A; Bausch & Lomb), Galyfilcon (such as Galyfilcon A; Vistakon), or Comfilcon (such as Comfilcon A; CooperVision). Additional examples of suitable materials used to make contact lenses include, without limitation, etafilcon A, genfilcon A, senofilcon A, lenefilcon A, lotrifilcon B, or polymacon.

The contact lenses imaged using the present methods can be spheric contact lenses or aspheric contact lenses. In addition, the contact lenses can be a lens selected from the group consisting of monofocal contact lenses, multifocal contact lenses (including bifocal contact lenses), toric contact lenses, and combinations thereof. In certain embodiments, the contact lenses imaged with the present methods include wavefront aberration correcting or reducing contact lenses.

As discussed herein, the present methods use one or more OCT systems to provide or obtain images of lenses, including vision correcting lenses, such as contact lenses. The lenses, or the images of the lenses, can be analyzed to measure one or more features of the lenses. Thus, embodiments of the present methods can be understood to be lens metrology methods, and in embodiments in which the lens is a vision correcting lens, such as a contact lens, embodiments of the present methods can be understood to be contact lens metrology methods. The use of the OCT systems and images obtained therefrom can be used in the design of lenses, such as contact lenses. Thus, embodiments of the present methods can be understood to be methods of designing lenses, or methods of designing contact lenses. In addition or alternatively, the OCT systems and images obtained therefrom can be used in the manufacture of lenses, such as contact lenses. Thus, embodiments of the present methods can be understood to be methods of manufacturing lenses or methods of manufacturing contact lenses.

In at least one embodiment of a lens metrology method, the lens is a vision correcting lens and the lens is imaged using the OCT system(s) when the lens is not in contact with an eye of an individual, such as a person. For example, the vision correcting lens can be imaged with an OCT system while the lens is not in contact with a portion of a person's eye, such as the cornea of the eye. Being able to image vision correcting lenses, such as contact lenses or other soft flexible lenses, while they are not in contact with a person's eye enables certain features of the lenses to be measured or determined that otherwise could not be accurately determined due to the interaction of the eye with the lens. For example, it is believed that a lens, such as a contact lens, when placed on the exterior corneal surface of an eye will have a different curvature and profile then a lens which is not placed on the corneal surface. Thus, it may be advantageous to image lenses, such as contact lenses, using an OCT system when the lens is not in contact with an eye. In addition, by imaging lenses that are not in contact with an eye, it is possible to avoid motion-induced artifacts that are associated with blinking and other ocular conditions. These artifacts or distortions can be eliminated or reduced even when using conventional OCT systems instead of SOCT systems, as described herein. Although embodiments of the present methods can image lenses that are not in contact with the eye, other embodiments may permit imaging of a vision correcting lens when in contact with an eye of an individual. For example, methods of designing vision correcting lenses, such as contact lenses, can comprise imaging the lens using an OCT system while the lens is in contact with an eye of a person, or a portion of the eye. Similarly, methods of manufacturing vision correcting lenses, such as contact lenses, can comprise imaging the lens using an OCT system while the lens is in contact with an eye of a person, or a portion of the eye. Such methods can include additional steps, as discussed herein, which are not present when examining contact lenses with an OCT system for lens fit on an eye. In addition, the OCT system can be used to measure other lenses, such as corneal onlay lenses (i.e., lenses structured for placement between a corneal epithelium and Bowman's membrane of an eye) and corneal inlay lenses (i.e., lenses structured for placement within the stroma of an eye), while such other lenses are in contact with a portion of an eye.

In embodiments of the present methods in which the lens is imaged in vitro (i.e., while not contacting an eye), the lens can be imaged in a container. For example, the lens can be imaged in a container that has at least one substantially or completely transparent sidewall to permit imaging of the lens located therein by the OCT system. In further embodiments, the lens may be placed in a volume of liquid located in the container. For example, the lens may be located in an aqueous liquid, such as water, including deionized water, or a buffered solution, such as a buffered saline solution. The container may be sealed or may have an opening. In certain embodiments, a contact lens is imaged in a volume of water located in a cuvette.

Although the present methods can be practiced to image a lens, such as a contact lens, in a hydrated state, such as a lens that is partially swollen or completely swollen with water, the present methods can also be practiced to image unhydrated lenses. For example, methods may comprise imaging a lens, such as a contact lens, using an OCT system, wherein the lens has not been hydrated or has been dehydrated. For example, a contact lens may be imaged with an OCT system after a demolding procedure, for example when the contact lens is in contact with one mold member of a lens mold; after a delensing procedure, for example, when a contact lens has been separated from a mold member; after an extraction procedure and before hydration with water; and/or after a hydration procedure and a dehydration procedure to dehydrate the hydrated lens.

The OCT systems used in the present methods provide at least one image of a lens. In certain embodiments, including lens metrology methods, lens design methods, and lens manufacturing methods, the at least one image can be selected from the group consisting of lens surface images, lens section images, and combinations thereof. For example, the image may be an anterior lens surface image, a posterior lens surface image, or both. Thus, with the present methods, various features of a lens, such as lens thickness, lens shape, and the like can be accurately measured. In comparison to existing lens metrology methods, the present metrology methods are able to provide measurement of one or more features of a lens, such as a contact lens, without cutting the lens and without contacting the lens. Thus, the "natural"

physical and/or optical features of the lens can be determined and evaluated prior to use of the lens by an individual.

In certain embodiments of the present methods, including the contact lens metrology methods, contact lens design methods, and contact lens manufacturing methods, the methods may also comprise determining a lens feature of the lens being imaged. For example, methods may comprise determining a lens feature selected from the group consisting of lens thickness, lens shape, lens curvature, lens power, lens edge profile, and combinations thereof. In additional embodiments, the method may comprise determining a lens feature selected from the group consisting of a thickness profile of the lens, a back surface shape of the lens, a front surface shape of the lens, and combinations thereof. The determining can include one or more steps of measuring one or more of such features from one or more images of the imaged lenses. For example, the OCT system can be used to provide one or more images, such as computerized or digital images of a lens, such as a contact lens, and the resulting images can be examined, either manually by a person or automatically using a machine, to determine one or more of the features described above.

Figure 4:
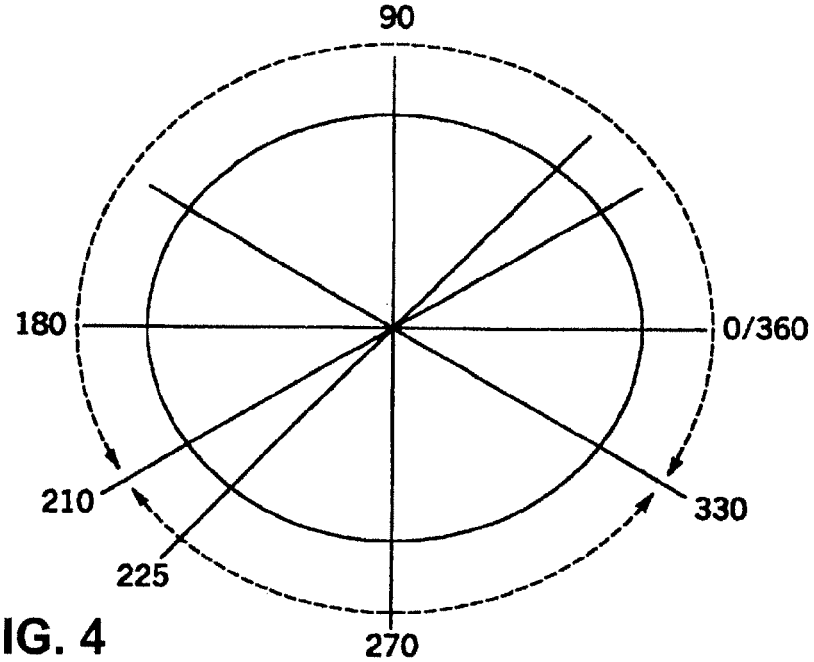
FIG. 4 is an illustration of meridians of a contact lens.

In at least one specific embodiment, a method, including a lens metrology method, comprises determining a lens thickness profile of the lens along a meridian of the lens selected from the group consisting of the 0 degree meridian, the 30 degree meridian, the 45 degree meridian, the 90 degree meridian, the 135 degree meridian, the 150 degree meridian, the 180 degree meridian, the 210 degree meridian, the 225 degree meridian, the 270 degree meridian, the 300 degree meridian, the 315 degree meridian, and combinations thereof. Such methods can be practiced while the lens is located on an eye (e.g., in vivo) or while the lens is not in contact with the eye (e.g., in vitro). The different meridians of the lenses are understood by persons of ordinary skill in the art, with examples of some of the meridians being illustrated in FIG. 4.

Certain embodiments of the present methods image a lens by directing broadband light, such as provided by the OCT system, towards the lens being imaged. The broadband light can be filtered if desired to provide light at a narrower wavelength or wavelengths. These or other embodiments may comprise directing infrared or near-infrared laser light or energy toward the lens being imaged. For example, in certain methods, light is emitted from a superluminescent diode at a wavelength from about 800 nm to about 1400 nm, and at a power from about 200 microwatts to 1 milliwatt. In other methods, the power of the light used for imaging can be greater than 1 milliwatt. For example, in certain methods, the power of the emitted light can be as great as 50 milliwatts. Compared to biological tissue imaging, such as retinal and corneal OCT imaging, or in vivo imaging, with the present in vitro methods, light can be used at a greater power than used in vivo since there is no risk of damaging biological tissue of a patient. In certain methods, the power of light is from about 300 microwatts to about 40 milliwatts. For example, the power of light can be between about 400 microwatts and about 30 milliwatts, between about 500 microwatts and 20 milliwatts, or between 600 microwatts and 10 milliwatts. Or, the power of emitted light can be less than 50 milliwatts, less than 40 milliwatts, less than 30 milliwatts, less than 20 milliwatts, less than 10 milliwatts, less than 5 milliwatts, or less than 2 milliwatts. The light can be emitted from a light source at any of the above powers. In addition, the light can be attenuated using an attenuator to reduce the light intensity from a greater power to a power useful to obtain the images. In addition, other methods may use an OCT system that images the lens or lens mold with a wavelength of light less than 800 nm or greater than 1400 nm. In such methods, it may be desirable to use light sensors that sense the light of these other wavelengths. The axial resolution of lenses being imaged using the present methods is from about 1 micrometer to about 100 micrometers, for example, from about 2 micrometers to about 20 micrometers, or from about 3 micrometers to about 10 micrometers; and the lateral resolution can be less than about 100 micrometers, for example, about 80 micrometers, or about 70 micrometers, or about 50 micrometers, or about 25 micrometers, or less.

The present methods may also include one or more steps of inspecting the lens for defects. For example, by examining the image(s) of the lens provided by the OCT system, one or more lens defects may be identified which can serve as an indication that the lens is unacceptable for its intended purpose. For example, the lens or lens image can be inspected for bubbles, surface irregularities, such as waviness and the like, tears, chips, opacities, and other defects understood by persons of ordinary skill in the art.

As discussed herein, the present methods include methods of designing lenses using one or more OCT systems, including SOCT systems if desired. For example, an embodiment relates to methods of designing a vision correcting lens.

A method of designing a vision correcting lens comprises examining information obtained from at least one image of a first vision correcting lens imaged with an OCT system, and designing a second vision correcting lens using the examined information of the first vision correcting lens. In certain embodiments, the vision correcting lens is a contact lens, including a silicone hydrogel contact lens. The examined information can include any lens feature or combination of features. In certain embodiments, the examined information is selected from the group consisting of lens shape, lens curvature, lens power, lens thickness profile, lens anterior surface shape, lens posterior surface shape, lens edge profile, and combinations thereof.

The design methods may also include a step of determining the shape of a cornea of a person using the OCT system. In addition, methods of designing a vision correcting lens, can include examining the fit of a contact lens on a person's eye, and designing a second contact lens based on the lens fit. For example, if the lens fit of the first lens is acceptable, the second contact lens can be designed to have the same or substantially the same fit. Or, if the lens fit of the first lens is unacceptable, the second contact lens can be designed to have a better or more comfortable fit compared to the first lens.

As an example, a contact lens design method may comprise one or more of the following steps: determining or measuring corneal surface topography of a patient to produce corneal surface topography information that can be manipulated with a computer; providing tear film information or data of the patient in a computer; designing a posterior contact lens surface based on the corneal surface topography information, the tear film information, or both; designing the thickness of the contact lens and the anterior contact lens surface based on the prescription of the patient and/or the information present in the computer; verifying or confirming the contact lens thickness using an OCT system; and combinations thereof. For example, the OCT system can be used to confirm that contact lenses of specific designs have the desired characteristics.

In addition, methods can comprise collecting surface data of the contact lenses. For example, anterior surface topography, posterior surface topography, or both can be determined. The optical power of the contact lens can be determined, such as automatically calculated, using the thickness data obtained from OCT images, the surface topography data, and combinations thereof.

The present methods also include methods of manufacturing lenses, as described herein. In certain embodiments, the manufacturing methods are used to produce vision correcting lenses. For example, in some specific embodiments, the lens being manufactured can be a corneal onlay lens or a contact lens. The present manufacturing methods can include lathing the lenses, spincast molding the lenses, or cast molding the lenses.

In certain specific embodiments, the lens is a cast molded contact lens or cast molded corneal onlay lens.

The present methods may include one or more additional steps, such as steps of a cast molding procedure, as understood by persons of ordinary skill in the art. For example, certain methods of manufacturing a lens, such as a contact lens, include placing a polymerizable lens forming material in a lens mold, curing a polymerizable lens forming material in a lens mold, demolding a lens mold to produce a mold member having a polymerized lens product, delensing a polymerized lens product from a mold member of a lens mold, extracting an extractable component from a delensed polymerized lens product, hydrating a delensed polymerized lens product, inspecting a hydrated lens obtained from a lens mold, packaging a lens in a volume of liquid in a package, sterilizing a lens located in a sealed package. Embodiments of the present methods may also include one or more combinations of the foregoing steps.

In addition or alternatively, the present manufacturing methods may also comprise a step of imaging a lens mold or a lens mold member using an OCT system. For example, during a lens manufacturing process that includes molding lenses, such as contact lenses, variations in lens molds that can occur over time may affect the quality and yield rate of lenses obtained therefrom. Embodiments of the present methods can comprise imaging a single mold member of a lens mold, such as of a two-piece lens mold, or separately imaging both mold members of a lens mold. Additional embodiments can comprise imaging a complete mold suitable for forming a lens. As examples, using the present methods, it is possible to measure the curvature of a single mold member, such as the curvature of a lens surface defining region of the mold member, the thickness of the lens-shaped cavity of the lens mold, the thickness of the lens mold or lens mold member, among other things. Measuring these and other features of lens molds can be helpful in manufacturing of lenses, such as contact lenses. For example, changes in lens mold thickness over time can affect curing of polymerizable materials used to produce lenses. Using the present methods, the quality of the lens molds can be monitored to continue to produce large amounts of acceptable lenses.

As shown in FIG. 1, a contact lens 10 was imaged with a Visante OCT system to provide an image of a section of the contact lens. Similar sectional images can be obtained of contact lenses in vitro with other OCT systems. Images such as illustrated in FIG. 1 can be used to determine a thickness profile of the contact lens.

Figure 3:
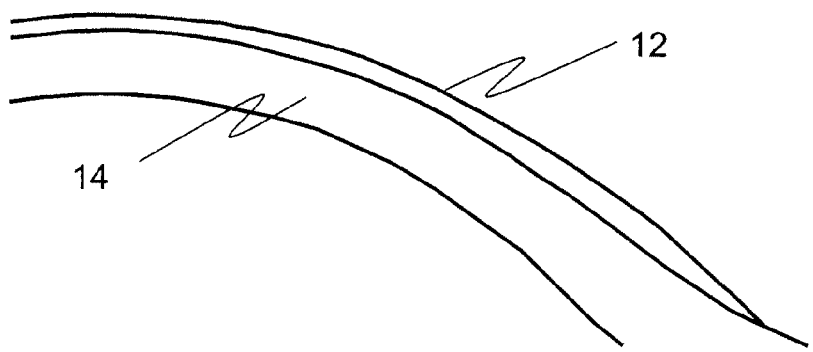
FIG. 3 is an illustration of a section view of a contact lens imaged in vivo using an OCT system.

Using OCT images, such as those illustrated in FIG. 1 or FIG. 3, digital or computerized representations of contact lenses can be obtained. Such representations can provide information such as surface features and shapes that can help in the design and manufacture of lenses. In addition, the representations can be useful in determining curvature of a lens, such as a base curve of a lens, among other things. For example, using software and automated computer routines, the image can be pseudo-color coded to provide visually identifiable regions of the imaged lens surface, such as thickness information, spatial features, and the like.

Figure 2:
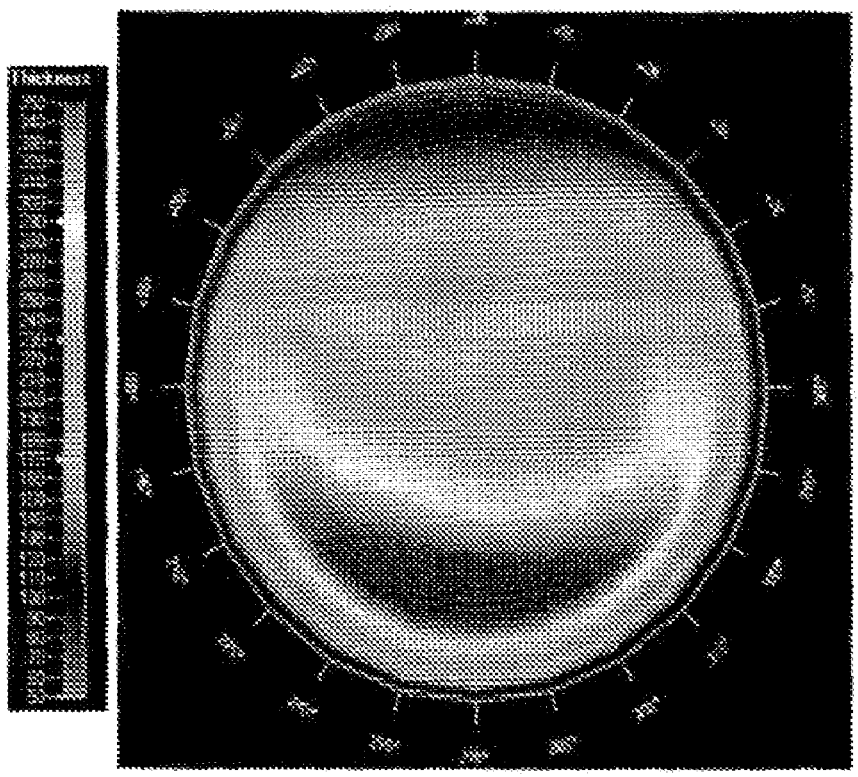
FIG. 2 is an illustration of an example of a pseudo-colored surface view of a contact lens.

An example of a digital representation of contact lens is illustrated in FIG. 2. The representation includes a computer generated code illustrating the thickness of the lens along a number of meridians. Digital lens representations or lens images obtained from OCT section images can be prepared and appear similar to that illustrated in FIG. 2.

As shown in FIG. 3, a contact lens 12 was imaged with a Visante OCT system while the contact lens was located on a cornea 14 of an eye of a person. Similar sectional images can be obtained of other contact lenses in vivo using other OCT systems, including SOCT systems. Such in vivo images can be used to help design other contact lenses based on lens shape and lens fit, relative to a person's cornea.

Figure 5:
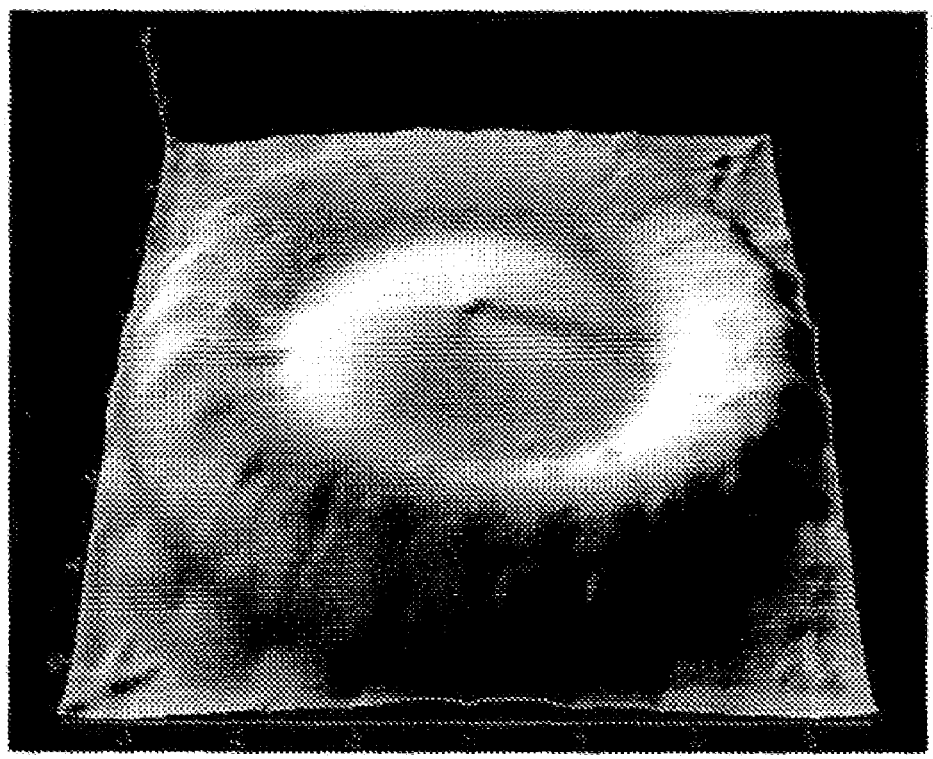
FIG. 5 is an illustration of an example of a surface view of a contact lens.

Another example of a digital representation of a contact lens is illustrated in FIG. 5. The representation includes lens surface topography information and lens curvature information among other things. In addition, such a representation can be coded to include lens thickness information. Digital lens representations or images obtained from OCT section images can be prepared and appear similar to that illustrated in FIG. 5.

In one embodiment, a method comprises providing an OCT system or a plurality of OCT systems. For example, the OCT systems can be obtained from publicly available sources. A lens, such as a contact lens or other vision correcting lens can be placed in a container containing a volume of liquid, such as water. The container with the lens is placed in a light path of the OCT system. A person or computer, or both, operate the OCT system to perform a plurality of optical section scans of the lens located in the container. The data obtained therefrom is collected by a computer and can be displayed on a computer monitor or other display device. Software can be used to analyze the data and provide images useful in the present methods. The images can be examined to determine thickness profiles, edge profiles, surface designs, surface curvature and the like, which can then also be used in the design and manufacture of additional contact lenses. Thus, with the present methods, lenses with improved patient comfort can be designed, and lenses with improved yield rates due to enhanced quality control, can be obtained.

In view of the disclosure herein, certain embodiments of the present methods can be understood to comprise, consist essentially of, or consist of imaging a lens, such as a contact lens, using an OCT system other than a SOCT system.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

A number of publications and patents have been cited hereinabove. Each of the cited publications and patents are hereby incorporated by reference in their entireties.

What is claimed is:

1. A metrological method for a lens, comprising:
    imaging a vision correcting lens using an optical coherence tomography system to obtain at least one image of the lens, wherein the lens is imaged when the lens is not in contact with an eye of an individual.

2. The method of claim 1, wherein the lens is a contact lens, an intraocular lens, a corneal onlay lens, a corneal inlay lens, or a spectacle lens.

3. The method of claim 1, wherein the lens is imaged in a container.

4. The method of claim 1, wherein the lens is imaged while placed in a volume of liquid in a container.

5. The method of claim 1, wherein the lens is a hydrated lens or an unhydrated lens.

6. The method of claim 1, where in the at least one image of the lens includes an image selected from the group consisting of lens surface images, lens section images, and combinations thereof.

7. The method of claim 6, wherein the image is a lens surface image selected from the group consisting of an anterior lens surface image and a posterior lens surface image.

8. The method of claim 1, wherein the imaging is performed without cutting the lens or without contacting the lens with a portion of the optical coherence tomography system.

9. The method of claim 1, wherein the imaging is performed using an optical coherence tomography system other than a spectral optical coherence tomography system.

10. The method of claim 1, wherein the imaging comprises directing broadband light towards the lens being imaged.

11. The method of claim 1, wherein the imaging comprises directing an infrared laser toward the lens being imaged.

12. The method of claim 1, further comprising determining a lens feature selected from the group consisting of a lens thickness of the lens, a lens shape of the lens, a lens curvature of the lens, a lens power of the lens, a lens edge profile of the lens, and combinations thereof using the at least one image of the lens.

13. The method of claim 1, further comprising determining a lens feature selected from the group consisting of a thickness profile of the lens, a back surface shape of the lens, a front surface shape of the lens, and combinations thereof using the at least one image of the lens.

14. The method of claim 1, further comprising determining a lens thickness profile of the lens along a meridian of the lens selected from the group consisting of the 0 degree meridian, the 30 degree meridian, the 45 degree meridian, the 90 degree meridian, the 135 degree meridian, the 150 degree meridian, the 180 degree meridian, the 210 degree meridian, the 225 degree meridian, the 270 degree meridian, the 300 degree meridian, the 315 degree meridian, and combinations thereof.

15. The method of claim 1, wherein the lens is a spheric contact lens or an aspheric contact lens.

16. The method of claim 1, wherein the lens is a monofocal contact lens, a multifocal contact lens, or a toric contact lens.

17. The method of claim 1, wherein the lens is a silicone hydrogel contact lens.

18. The method of claim 1, further comprising inspecting the lens for defects using the at least one image of the lens.

19. A metrological method for a lens, comprising:
    imaging a vision correcting lens using an optical coherence tomography system to obtain at least one image of the lens, wherein the lens is imaged when in contact with an eye of an individual.

20. The method of claim 19, wherein the lens is a contact lens, an intraocular lens, a corneal onlay lens, or a corneal inlay lens.

21. The method of claim 19, wherein the lens is a hydrated lens or an unhydrated lens.

22. The method of claim 19, where in the at least one image of the lens includes an image selected from the group consisting of lens surface images, lens section images, and combinations thereof.

23. The method of claim 19, wherein the image is a lens surface image selected from the group consisting of an anterior lens surface image and a posterior lens surface image.

24. The method of claim 19, wherein the imaging is performed without cutting the lens or without contacting the lens with a portion of the optical coherence tomography system.

25. The method of claim 19, wherein the imaging is performed using an optical coherence tomography system other than a spectral optical coherence tomography system.

26. The method of claim 19, wherein the imaging comprises directing broadband light towards the lens being imaged.

27. The method of claim 19, wherein the imaging comprises directing an infrared laser toward the lens being imaged.

28. The method of claim 19, further comprising determining a lens feature selected from the group consisting of a lens thickness of the lens, a lens shape of the lens, a lens curvature of the lens, a lens power of the lens, a lens edge profile of the lens, and combinations thereof using the at least one image of the lens.

29. The method of claim 19, further comprising determining a lens feature selected from the group consisting of a thickness profile of the lens, a back surface shape of the lens, a front surface shape of the lens, and combinations thereof using the at least one image of the lens.

30. The method of claim 19, further comprising determining a lens thickness profile of the lens along a meridian of the lens selected from the group consisting of the 0 degree meridian, the 30 degree meridian, the 45 degree meridian, the 90 degree meridian, the 135 degree meridian, the 150 degree meridian, the 180 degree meridian, the 210 degree meridian, the 225 degree meridian, the 270 degree meridian, the 300 degree meridian, the 315 degree meridian, and combinations thereof.

31. The method of claim 19, wherein the lens is a spheric contact lens or an aspheric contact lens.

32. The method of claim 19, wherein the lens is a monofocal contact lens, a multifocal contact lens, or a toric contact lens.

33. The method of claim 19, wherein the lens is a silicone hydrogel contact lens.

34. The method of claim 19, further comprising inspecting the lens for defects using the at least one image of the lens.

35. A method of designing a vision correcting lens, comprising
    examining information obtained from at least one image of a first vision correcting lens imaged with an optical coherence tomography system, and
    designing a second vision correcting lens using the examined information of the first vision correcting lens.

36. The method of claim 35, further comprising determining the shape of a cornea of a person using the optical coherence tomography system.

37. The method of claim 35, wherein the vision correcting lens is a contact lens.

38. The method of claim 35, wherein the examined information is selected from the group consisting of lens shape, lens curvature, lens power, lens thickness profile, lens anterior surface shape, lens posterior surface shape, lens edge profile, and combinations thereof.

39. A method of manufacturing lenses, comprising:
    examining information obtained from at least one image of a lens imaged with an optical coherence tomography system during the manufacture of the lens, and
    controlling the quality of lenses produced using the examined information of the lens.

40. The method of claim 39, wherein the lens is a vision correcting lens.

41. The method of claim 40, wherein the lens is a corneal onlay lens or a contact lens.

42. The method of claim 39, further comprising a step selected from the group consisting of placing a polymerizable lens forming material in a lens mold, curing a polymerizable lens forming material in a lens mold, demolding a lens mold to produce a mold member having a polymerized lens product, delensing a polymerized lens product from a mold member of a lens mold, extracting an extractable component from a delensed polymerized lens product, hydrating a delensed polymerized lens product, inspecting a hydrated lens obtained from a lens mold, packaging a lens in a volume of liquid in a package, sterilizing a lens located in a sealed package, and combinations thereof.

43. The method of claim 39, further comprising a step selected from the group consisting of accepting the imaged lens or a batch of lenses similar to the imaged lens, rejecting the imaged lens or a batch of lenses similar to the imaged lens, categorizing the imaged lens or a batch of lenses similar to the imaged lens, and combinations thereof using the examined information.

44. The method of claim 39, further comprising obtaining at least one image of a lens mold for producing a lens or a portion thereof using an optical coherence tomography system.

* * * * *

UNITED STATES PATENT AND TRADEMARK OFFICE
CERTIFICATE OF CORRECTION

PATENT NO. : 7,416,300 B2  Page 1 of 1
APPLICATION NO. : 11/752202
DATED : August 26, 2008
INVENTOR(S) : Jianping Wei et al.

It is certified that error appears in the above-identified patent and that said Letters Patent is hereby corrected as shown below:

In column 1, line 59, delete "and," and insert -- and --, therefor.

In claim 6, line 1, delete "where in" and insert -- wherein --.

In claim 22, line 1, delete "where in" and insert -- wherein --.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,416,300 B2 | Page 1 of 1 |
| APPLICATION NO. | : 11/752202 | |
| DATED | : August 26, 2008 | |
| INVENTOR(S) | : Jianping Wei et al. | |

It is certified that error appears in the above-identified patent and that said Letters Patent is hereby corrected as shown below:

In column 1, line 59, delete "and," and insert -- and --, therefor.

Column 11, line 5 (claim 6) delete "where in" and insert -- wherein --.

Column 11, line 61 (claim 22) delete "where in" and insert -- wherein --.

This certificate supersedes the Certificate of Correction issued June 1, 2010.

Signed and Sealed this

Twenty-ninth Day of June, 2010

David J. Kappos
*Director of the United States Patent and Trademark Office*